Aug. 21, 1956 — W. R. SMYTHE ET AL — 2,759,785
CAMERA FOR RECORDING THE YAW OF A
SPIN-STABILIZED PROJECTILE

Filed May 11, 1949 — 2 Sheets-Sheet 1

INVENTORS
WILLIAM R. SMYTHE
IRA S. BOWEN

BY

ATTORNEY

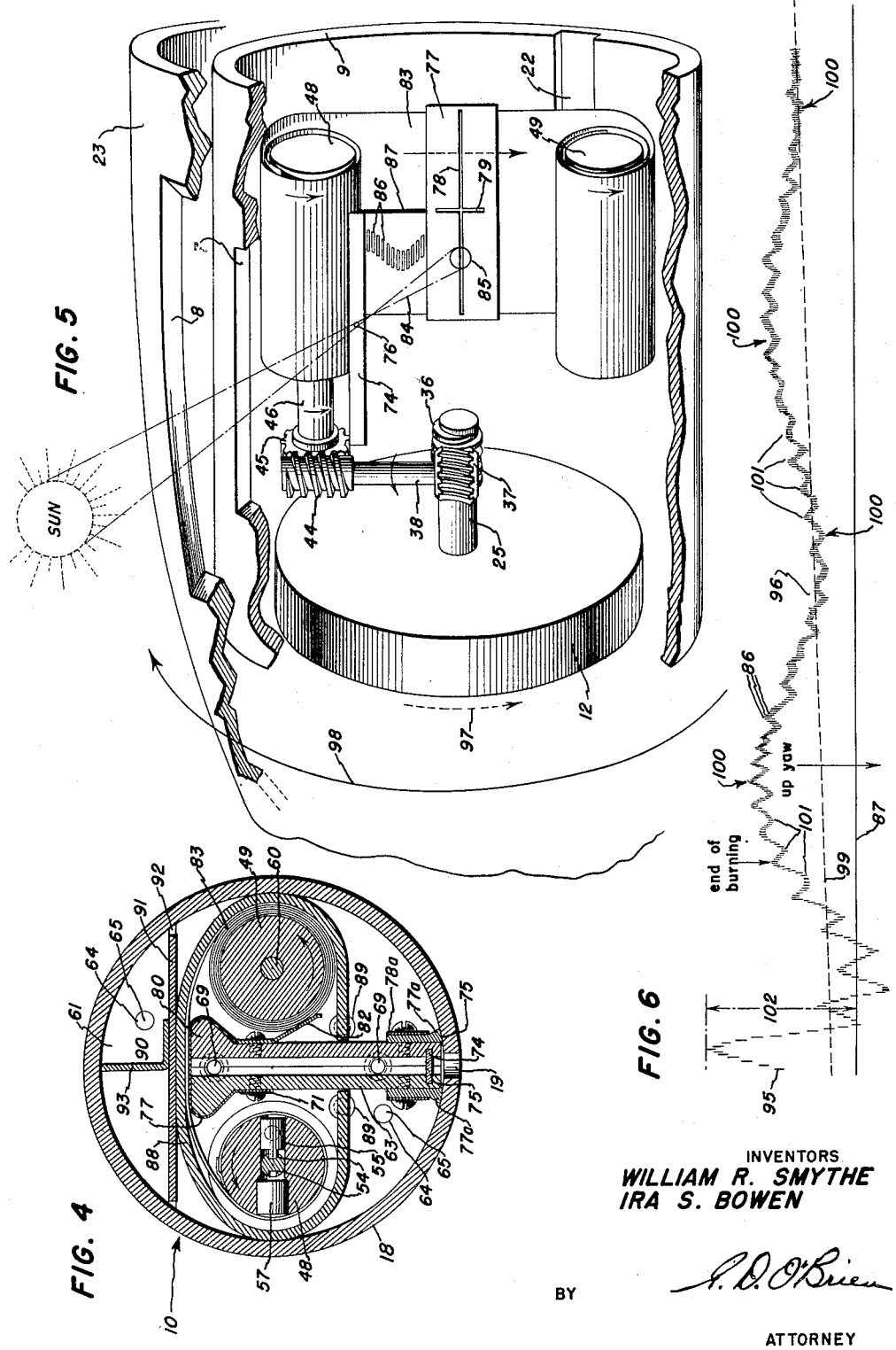

United States Patent Office 2,759,785
Patented Aug. 21, 1956

2,759,785

CAMERA FOR RECORDING THE YAW OF A SPIN-STABILIZED PROJECTILE

William R. Smythe, Sierra Madre, and Ira S. Bowen, Altadena, Calif., assignors to the United States of America as represented by the Secretary of the Navy Application May 11, 1949, Serial No. 92,686

9 Claims. (Cl. 346—38)

This invention relate to improvements in cameras, especially to the end of facilitating the ballistics investigation of pre-spun and spin-stabilized projectiles. In furtherance of that purpose, the camera is installed in a test projectile having all of the physical characteristics of the specific type of projectile to be investigated, in the nose of the former of which the camera is incorporated in place of the normally occupant explosive charge for the purpose of recording the behavior of the projectile while in flight.

The revival in comparatively recent times of the use of the rocket as the propelling vehicle for an explosive projectile toward its target has demonstrated the need of securing data concerning the motions of such rocket during flight so as to furnish a basis for needed corrections in said flight, especially of the modern pre-spun, spin-stabilized type. The instant camera, for which the name solar yaw camera was derived from at least two dominant features concerned with it, was developed in order to obtain the needed data. Until it was used, little was known about the flight behavior of this type of rocket, except for deductions made from data obtained at the beginning or end of the trajectory, or from observation of the obvious tumbling of rockets when their flights was unstable.

One of the several faults of a spin-stabilized rocket is its tendency to yaw in flight, in other words, its tendency to assume an angle between its axis of symmetry and the direction of motion of its center of gravity. Since the yaw occurs while the rocket is in rapid flight, and most of it while the rocket is high above ground, it is manifestly impossible to satisfactorily see it and certainly not to record it, there being no known means for that purpose.

The inability to see and measure from a station on the ground does not apply to the trajectory of the rocket, and the angular attitude of other kinds of moving objects, for instance an airplane, can be obtained by taking pictures from it of some distant point. But in the case of a rocket which is a diminutive contrivance as compared with an airplane, the problem of photographically recording its angular attitudes in flight involves such considerations as keeping the apparatus down to such size and shape that it can be inserted in the head of the rocket without changing the mass, moments of inertia, position of the center of gravity or shape.

Furthermore, in the case of a rotating projectile as herein contemplated, parts of the camera must in extreme instances be able to withstand centrifugal forces up to 6000 g. Restrictions such as these rule out elaborate shutters and lens systems, and practically leave only the sun as a possible reference point. Therefore, the sun is used as a fixed reference point in the sky during the flight of the rocket. Its rays enter a pinhole in the wall of the camera, then pass through a slit in the camera and finally strike the film behind the slit, leaving a picture of a short section of the slit on the film.

Each time the rocket makes one complete revolution the pinhole again faces the sun, whereupon the image of the sun sweeps across the slit and affects the film behind it. Since the film moves continuously past the slit in a direction normal to the axis of the rocket, the succession of exposures of the slit form a line made up of short images on the film. A reference line, which for the purposes of this description is conveniently known as the fixed reference line, runs along the center of the film, and it is in respect to this line that the short images, dashes in other words, are superimposed on the film.

As long as the sun-rays strike the rocket normal to its axis, the dashes will cross the fixed reference line exactly, there being as much of each dash on one side of said line as on the other. But if the rocket tilts so that its axis becomes greater or less than normal to the sun-rays, the light will enter the pinhole at an angle and the dashes will be displaced to one side or the other of the fixed reference line. The result will be a wavy line composed of minute dashes, the extent of its wandering above and below the fixed reference line denoting the amount of yaw. The displacement of the individual dashes from said fixed reference line is proportional to the cotangent of the angle between the sun-rays and the axis of the rocket, and it is the making of a record of that angle and its measurement that constitutes one of the objects of the invention.

Anoher object of the invention is to provide a camera for recording the yaw, hence determining the aerodynamic forces acting on a spin-stabilized rocket.

Another object of the invention is to provide what is herein known as a stationary flywheel, it being the inertia of the latter and its consequent reluctance to rotate with the spinning rocket that furnishes the power for actuating at least one of the film spools.

Another object of the invention is to combine a camera with a spinnable test missile, whether of the rocket or other type, for recording such malfunctions as tip-off, nutation, precession and the like, all factors of the undesirable yawing of the missile, for the purpose of determining what corrections should be made in the aerodynamic design of counterparts of said missile.

Another object of the invention is to provide a test projectile wherein the place ordinarily assumed by the explosive is substituted by camera structure which is animated by the spinning of the projectile, thus converting the projectile into a flying motion picture camera adapted to automatically record its own performance in flight.

Other objects and many of the attendant advantages of this invention will be readily appreciated as the same becomes better understood by reference to the following detailed description when considered in connection with the accompanying drawings wherein:

Fig. 4 is a cross section taken on the line 4—4 of Fig. 1, parts being shown in elevation;

Fig. 5 is a schematic perspective view of the essentials of the camera, diagrammatically illustrating its operation, and Fig. 6 is an illustration of a typical photographic record produced by the camera.

Figure 1:
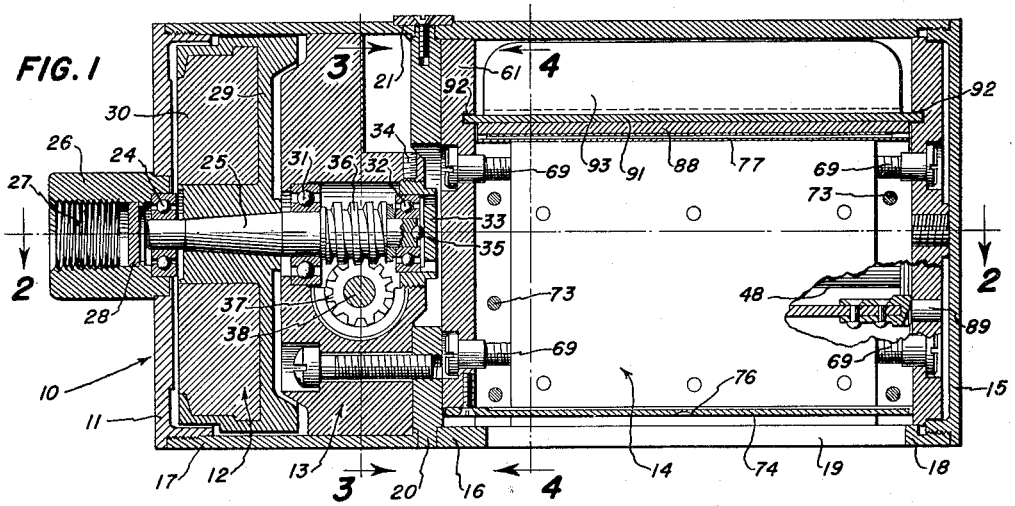
Fig. 1 is a central, longitudinal section of the camera, parts being shown in elevation.

The camera, generally designated 10 is composed of six main parts which are assembled in the following order. Beginning at the left or forward end (Fig. 1), there is a front cover plate 11, the previously mentioned and so-called stationary flywheel 12, a gear box 13, a film magazine 14, a rear cover plate 15 and a cylindrical case 16 in which the flywheel, gear box and film magazine are housed and to the ends of which the cover plates are attached. The case actually consists of two cylinders, the short one 17 containing the flywheel and gear box, the long one 18 containing the film magazine. The long cylinder has a slit 19 through which light is admitted, specifically sun-rays, to affect the sensitized film.

A bulkhead 20 provides a common mount to which the near ends of the cylinders are soldered, thereby becoming a partition which divides the cylinder into two chambers. A key 21 is secured to the bulkhead, lying partly in depressions in the contiguous cylinder ends to prevent its getting out of line. The key, in turn, is adapted to occupy a slot such as 22 (Fig. 5) in a camera support 9 to prevent turning of the camera 10 in respect to the rocket head when once emplaced.

This support is suitably fixed in the rocket head 23. The body of the rocket extends off to the right in Fig. 5 but is not shown herein. The slit 19 in the camera case (Fig. 1) matches the registering slots 7 and 8 in the respective support 9 and rocket head 23. The assembly of slot and slit is 180° away from the key slot 22.

The cover plate 11 carries the front ball-bearing 24 of the flywheel shaft 25. This ball-bearing is seated in an accurately centered boss 26. The boss has a threaded bore 27 into which a tool for extracting the camera from the rocket head is adapted to be screwed. In practice the boss 26 is externally non-circular so that a wrench may conveniently be applied for unscrewing the front cover plate from the case. A disk 28 of fiber or the like, has a press-fit in a smooth part of the bore and against an internal shoulder to seal the ball-bearing.

An inert mass in the form of a flywheel is used herein, and consists of a combination of steel and lead in instances of what can be called long missile flights. The encasement 29 is of steel and the core 30 is of lead. This combination is not adhered to rigidly. For extremely long missile flights the flywheel is made of steel and tungsten, and for much shorter flights a solid steel flywheel has been used. The necessity for a durably flywheel is to enable it to withstand the force of the impact when the missile lands. In any case the flywheel is driven onto the tapered part of the shaft 25, immediately behind the front ball-bearing.

The flywheel has been referred to as stationary. This is a term mainly of convenience, and needs to be explained. As the test rocket is fired it leaves the launcher not only at a high linear speed but also at a high rate of spin. Since the flywheel has an appreciable weight (an average weight of about 1.3 lb.) its inertia keeps it from spinning with the adjacent and surrounding structure, hence remains stationary during the major part of the trajector. This condition produces what can be called a differential rotation, and because of the fact that the projectile spins at a high rate and the flywheel stands still as far as rotation is concerned, said flywheel becomes the driving power which is delivered to the camera mechanism through a system of reduction gearing.

This gearing is contained by the gear box 13. The gear box is desirably machined from a single block of metal. It is secured to the bulkhead 20 by a plurality of screws. A pair 31, 32 of ball-bearings coacts with the front ball-bearing 24 to support the flywheel shaft 25. The central ball-bearing 31 is fitted directly against the gear box in a seat provided for it in the machining. The rearmost ball-bearing 32, however, is carried by a steel cup 33 which is threaded into the gear box and set there at its adjustments by a screw 34. A single ball 35, seated in a conical depression in the rear center of the shaft, delivers the end thrust of the shaft, due to setback, to the bottom of the cup 33. The worm 36, made integral with the shaft 25, is situated between the bearings 31, 32, and meshes with and drives a worm gear 37 on a cross-shaft 38.

Figure 3:
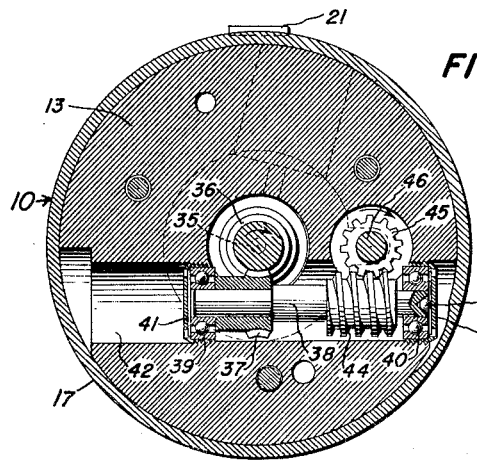
Fig. 3 is a cross section taken on the line 3—3 of Fig. 1, parts being shown in elevation.

The cross-shaft (Fig. 3) is revoluble in ball-bearings 39, 40. These are carried by steel cups 41 which are driven into threaded portions of a cross passage 42 in the gear box. Like the cup 33, the cups 41 are in practice secured by screws to set the adjustment of the cups and bearings for a proper end thrust and alignment of the cross-shaft gear 37 with the flywheel worm 36. In all instances the cups have holes in their bottoms to accommodate a spanner wrench by which the adjustments are made.

Since the cross-shaft 38 may take considerable end thrust from centrifugal force, the inside surface of its outer bearing cup 41 (Fig. 3) is hardened to withstand the pressure of a steel ball 43 which is seated in a conical depression centered in the end of the cross-shaft. A worm 44 on the cross-shaft meshes with and drives a worm gear 45 on the drive shaft 46. The drive shaft is supported by ball-bearings 52, 53 arranged much on the order of the flywheel shaft bearings. Thus far it can be understood that the worm and worm-gear coupling drives the camera by virtue of the stationary condition of the flywheel and the rapidly spinning motion of the rocket around it. The gear reduction is at a ratio of 1:400.

Figure 2:
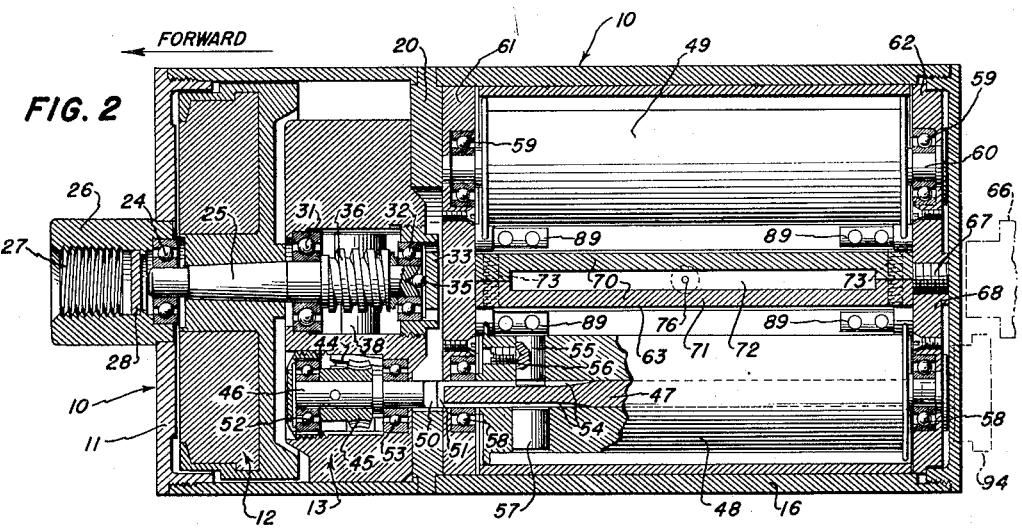
Fig. 2 is a similar view, the section being taken on the line 2—2 of Fig. 1, parts again being shown in elevation.

The power thus derived is transmitted to the spindle 47 of the film magazine spool mechanism which consists mainly of the take-up spool 48, and as the latter revolves it unwinds the sensitized film from a supply spool 49 (Figs. 2 and 4). The drive shaft 46 of the gear box 13 and spindle 47 of the spool mechanism are coupled by the interengagement of a tongue 50 (Fig. 2) in the one and an end slot 51 in the other. Opposite sides of the spindle 47 adjacent to the slot 51 are grooved at 54 (Figs. 2 and 4). One of these contains the spline of a driving lug 55 which, in turn, is secured by a screw 56. In spite of the fact that the spools 48, 49 are made of magnesium, they may, because of the forces encountered in a spinning rocket, put a load as great as 500 lb. on their supporting spindles. For that reason it was found advisable to counterbalance the driving lug of the take-up spindle as at 57.

Pairs of ball-bearings 58, 59 respectively support the spindle 47 of the take-up spool 48 and the spindle 60 of the supply spool 49. One of each of these bearing pairs is seated in the magazine front end plate 61, while the other two bearings of the pairs are seated in the magazine rear end plate 62. The front end plate, rear end plate and center spacer 63 constitute the frame of the film magazine 14. This frame is handled as a unit, and when it is inserted in the case 10, each of two accurately drilled and reamed holes 64 (Fig. 4) in the front end plate 61 fits upon dowel pins 65 projecting rearwardly from the gear box through the bulkhead 20. This arrangement insures alignment and prevents turning of the film magazine and of the spool mechanism in the case 16 when once emplaced.

For the purpose of extracting the film magazine from the case after a test flight, a knob 65 is screwed into a hole 67 in the rear end plate after removal of the cover 15, thereby to provide a handle. A central boss 68 through which that hole is drilled, supports the magazine against the rear cover of the case when said cover is screwed home. Incidentally, the thread course of said cover is left-hand to prevent its loosening during the angular acceleration.

Two pairs of shoulder screws (Fig. 1) are driven through the plates 61 and 62 into tapped holes that strike the dividing line between the end heads 70 (Fig. 2) of the plates 71 of the spacer 63. These plates are milled to produce the heads and to define a channel 72 down the center when the heads are bolted together at 73. A pinhole bar 74 is slid into position in confronting grooves 75 (Fig. 4) in that end of the plates 71 next to the case slit 19. Said bar is secured to the plate 61 by a screw driven through one of its ends (Fig. 1). The bar thus closes the light entrance to the channel excepting for a pinhole 76 in the center. The back or inner end of the channel 72 is closed by a piece of film 77, symbolically shown in Fig. 5, which is opaque excepting for a long photographic slit 78 and a short cross-slit 79.

The sun-ray entering the case slit 19 penetrates the pinhole, passes through the channel and through the slits 78, 79 to reach the sensitized film. The outer end of the spacer 63 has lateral light seals 77a secured to it under retaining strips 78a which are fastened down by screws. The light seals bear on the inner wall of the case adjacent to the slit 19.

Extensions at opposite sides of the plates 71 (Fig. 4) form an enlargement 80 across which the piece of film 77 is folded, gelatin side in. One side of this film is secured by screws to one side of the center spacer under a backing strip 81 and on the other side, also by screws, under the magazine film spring 82. The spring 82 bears against the sensitized film 83 on the spool 49, whence it is unwound onto the take-up spool 48 by action of the camera. The ends of the film 83 are desirably attached to the two spools by adhesive tape to avoid the appearance of lumps that would show if the film ends were inserted in slots in the spools.

The slits 78 and 79 are made by a method which limits the long slit to a width of 0.002 inch, and the perpendicular short slit about three times wider. The sun-ray 84, representing a brilliant light source, after emerging from the pinhole 76 (Fig. 5) is intercepted by the piece 77. The sun-image or light spot 85 produces narrowly spaced dashes 86 on the film 83 as the rocket head 23 spins. The diffused daylight present in the channel serves to produce a longitudinal reference line 87 along the center of the film.

If the missile flight is true to its course the dashes will coincide with the reference line 87, bisecting it equally, but if the missile yaws or yields to other aberrant influences, the dashes will appear at one side or the other of the reference line (Fig. 6). The character of the resulting line of dashes is a faithful record of the behavior of the missile in flight, and can be analyzed toward the end of working out remedial measures against recurrence of the flight errors.

As the film unwinds from one spool and onto the other, the length of it between the spools is thrown outwardly by centrifugal force to slide across and thereby take the form of the film guide 88 (Fig. 4) which constrains it. It is extremely important that the surfaces along which the film must slide be smooth and continuous. The film guide 88 consists of two sections, each of which swings about a pivot axis running through pairs of lugs 89 (Figs. 1, 2 and 4), supported by the front and rear end plates 61, 62. These sections fit together smoothly, and are of unequal lengths so that the junction 90 (Fig. 4) does not come opposite the slit 78.

The guides are carried by the camera case, specifically by the plates 61 and 62 as pointed out, and are held in closed position by a closure plate 91 which is slid in grooves 92 (Figs. 1 and 4) in the same end plates. A flange 93 on the closure plate provides a fingerhold for its ready sliding in and out of position when the film magazine is extracted from the camera case. The latter is done, as has been pointed out, by temporarily screwing the knob 66 in place. A somewhat similar knob 94 (Fig. 1) is used in beginning the winding of the end of a new film onto the take-up spool 48.

That statement leads to a brief outline of the procedure in loading and assembling the camera. This is done in a dark room. Although the film spool 49 has a capacity of about forty inches of film, it is considered that thirty-six inches of film are sufficient for long test flights, whereas eighteen inches are ample for low-angle fire. The chosen quantity of film is wound tightly and smoothly on the supply spool 49, and is jarred down against the rear lip of that spool so that additional displacement does not occur during setback. The free end of the film is attached to the take-up spool by adhesive tape, for which preliminary acts the film guide 88 necessarily is open. The two sections of the guide are then closed and the plate 91 slid in place. The loaded magazine is then inserted in the case 10 and the cover plate 15 is screwed home. Thereupon the flywheel 12 is turned clockwise manually through about two hundred revolutions (chain-line arrow 97, Fig. 5) to ensure that the film is taut. The front cover plate 11 is now screwed on, and the entire camera 10 is inserted into the nose of the test rocket head.

The operation begins with the firing of the rocket from a launcher. If the rocket is so oriented in the launcher that the first exposure takes place while both bourrelet rings (the firing contact rings) are still constrained by the launcher, an accurate fiducial point is obtained from which deviations from the orientation at launching are readily obtained. Such a point would be the first dash 95 (Fig. 6) of the complex curve 96 which is pictured on the film after its chemical development following a test flight. It has been the practice to keep the slit 19 covered until the rocket is inserted in the launcher tube, or in the case of a launcher with open rails, to fasten a thin plate lightly over the slit and to secure it to one of the rails so that when the rocket is fired the thin plate is pulled away. The light then enters the slit.

During part of each revolution of the rocket the sun-ray 84 (Fig. 5) in the form of the light spot 85 sweeps across the slit 78, making an exposure on the film 83 immediately behind it of a length equal to the diameter of the spot. The result is a dash, as previously pointed out. The highest rate of spin commonly used is 265 R. P. M. Remembering that the width of the slit 78 is 0.002 inch, the duration of exposure for each dash 86 is 5.4 millionths of a second.

As indicated in Fig. 5, the direction of rotation of the rocket is clockwise when looking in the direction of flight (arrow 98). This is not to be confused with the brief manual turning of the flywheel when tightening the film. The flywheel remains stationary as far as rotation is concerned, due to its inertia, while the rocket spins around it. The effect is the same as though the flywheel were spun in the direction of the arrow 92 and the rocket remained stationary. The take-up spool is driven in the direction indicated, and the supply spool yields because of the pull on the film.

The diagram in Fig. 6 is an illustration of a portion of a camera record of a test rocket flight made at noon when the sun was at zenith. The dotted line 99 is drawn with a lead pencil on the finished record to denote the computed trajectory. This line is a mean of the precessions indicated at 100 by the wavering or yawing of the missile. While these precessions are in the course of making, the missile yields to other gyrating forces which show up in the record as the nutations 101. These precessions and nutations denote the lack of stability of the projectile, and in order to insure stability in rounds fired later it will be necessary that at whatever trajectory speeds they are made to travel the rate of spin must be made to exceed a certain critical value.

To make this plain, it is assumed that the rocket is fired from a pre-spin launcher, that is to say, a launcher which has means for imparting a spinning motion to the rocket before it is launched. It is desirable to fire the rocket promptly after the launcher gets up to speed, in order to avoid winding too much film or allowing the flywheel to begin turning. Enough initial spin is given to insure stability at the launch velocity but not enough to give stability at the burnt velocity.

At some intervening velocity, therefore, the round becomes unstable. In order to get the time of flight to instability the number of revolutions up to this point, as counted on the yaw camera record, is multiplied by the period of rotation from an acceleration camera located at the side. From this time factor and the acceleration camera record the velocity at which instability began can be determined. The point of instability is much clearer on the yaw camera record than in the acceleration camera picture, where a yaw of 3° is difficult to detect.

Evaluation of the camera record begins by making a 4x enlargement of a portion or all of it. The details are thus easier to see than from the record as it comes from the camera. A pair of dividers and a millimeter rule are used. The distance of the first measurement 102 (Fig. 6) from the central reference line 87 to the crest of the first nutation divided by the distance from the pinhole to the slit (the focal length of the camera) gives the cotangent of the angle between the nose of the projectile and the direction of the sun. Similar measurements are made at a suitable number of points on the trajectory.

The distance traveled by a particular rocket in one revolution, as well as the time required, could be found by counting the entire number of dashes 86. However, since the number of rotations per nutation is nearly constant, once this number is known the distances along the trajectory can be determined by the less laborious task of counting the nutations 101.

The interpretation of the measurements and their reconstruction into the complete picture of the flight of the rocket becomes a problem in three-dimensional geometry. The orientation of the round can be specified in any of the various ways of defining the direction of a line in space. The most practical set of coordinates appears to be the azimuth with respect to the range line and the altitude above the horizon.

The outgrowth from that conclusion is that one camera record does not give the complete orientation of the round in space, but shows its position only in that plane which is determined by the sun and the axis of the projectile. In fact, the round may lie anywhere on a cone whose axis is the line of the sun and whose vertex angle is the measured angle between the nose end of the axis of the round and the line of the sun.

Consequently, the method which has been used is to fire two identical test rockets, one when the sun just makes its appearance above the horizon, the other when the sun has moved 90° through the sky and is at zenith. The results are two records which will enable the observer to determine the positon of the rocket in each of two perpendicular planes.

In practice the use of three pinholes instead of the one shown has been found to be to advantage, namely the central pinhole to which this showing is confined, and one on each side of it nearer to the edges of the film. This is an expedient to make sure of getting the record since, as a matter of fact, as many as three potential records will be made it is assured that at least one of the three records will fall close enough to the center line to be measured conveniently even though the angle between the sun-ray and the axis of the projectile is not very close to perpendicular because of excessive yaw or some other cause. Even if one or two of the three records may run off the edges of the film strip there would always be at least one record to show under ordinary circumstances during stable flight.

Obviously many modifications and variations of the present invention are possible in the light of the above teachings. It is therefore to be understood that within the scope of the appended claims the invention may be practiced otherwise than as specifically described.

What is claimed is:

1. A ballistics recording device consisting of a pre-spun missile having a head with a pinhole adapted to face a brilliant external light source at every revolution, a photographic film strip confronting the pinhole being carried in the head and spun with it, spool mechanism carrying the film strip for movement past the pinhole, a mass coaxial with the head being inhibited by its inertia from spinning with the missile, and driving means coupling the mass and the spool mechanism, being animated through the spinning of the head relatively to the mass to move the film.

2. In a recording device, a photographic film strip and the head of a pre-spun missile containing the strip, said head having a pinhole confronting the film strip and serving as a shutter to admit and cut off light from a remote external source at every revolution, a mass idle in the head being inhibited by its inertia from spinning with the head, and film driving means coupling the mass and film, being animated by the revolution of the head relative to the mass to drive the film.

3. In a recording device, a hollow head integral with a pre-spinnable test missile, said head having a pinhole and constituting a camera shutter when spun, a photographic film strip in the head and a pair of spools, one a supply the other a take-up, sustaining the film strip in confronting relation to the pinhole, a mass idle in the head being inhibited by its inertia from spinning with the head, and film driving means coupling the mass with the take-up spool, being animated by the revolution of the head relative to the mass to drive the film.

4. A camera having mechanism consisting of a supply spool on which a strip of photographic film is adapted to be stored, a take-up spool to which the free end of the strip is attachable for unwinding, a wheel adapted to stand revolubly dormant in the camera and hence constituting an inert mass, gearing coupling the take-up spool to the wheel, and a shell with a single light opening, to the interior of which shell the spools are turnably attached, said shell encasing the mechanism and adapted to spin around the axis of the wheel while projected through space.

5. A camera consisting of a shell spinnable about its longitudinal axis while describing a trajectory, said shell having a slit to admit a flash from a brilliant external light source at every revolution, a bar behind the slit having a pinhole to resolve the flash into a light spot inside the camera, a piece of opaque material on which the spot falls, having a narrow slit penetrable by some of its light to form a dash, a photographic film strip behind the opaque piece to intercept the dash, spool mechanism carrying the strip and itself attached to the shell, an inert mass centered on said axis, and gearing coupling to the mass to the spool mechanism being animated to drive the film by the motion of the shell relative to the mass.

6. A camera consisting of a shell spinnable about its longitudinal axis while describing a trajectory, said shell having a slit to admit a flash from a brilliant external light source at every revolution, spacer means in line with the slit defining a channel, means across that end of the channel adjacent the slit having a pinhole, means across the opposite end of the channel having a narrow slit, two spools revolubly attached to the shell respectively flanking the spacer means to support a photographic film strip in transit across the narrow slit, an inert mass centered on said axis, and gearing coupling the mass to one of the spools being animated by the motion of the shell relative to the mass to drive said one spool continuously.

7. A camera consisting of a shell spinnable about its longitudinal axis while describing a trajectory, said shell having a slit to admit a flash from a brilliant external light source at every revolution, spacer means fixed in the shell defining a channel having a pinhole at one end adjacent the slit and a narrow slit at the other end, a supply spool and a take-up spool at the respective sides of the spacer means, being revolubly attached to the shell and adapted to be spanned by a photographic film strip in transit across the narrow slit, an inert mass centered on said axis, gearing coupling the mass to the take-up spool being animated by the motion of the shell relative to the mass to drive said take-up spool continuously, and guide means partly around the spools situated close to the narrow slit to support the spanning part of the film when pressed thereagainst by centrifugal force.

8. A camera consisting of a case insertable in a spinnable projectile shell and having a partition dividing it into two chambers, said case and shell having registering openings forming a composite light slit, an inert mass in the form of a wheel situated in one chamber and journaled on the axis of the shell, photographic film strip spools in the other chamber, spacer means also in said other chamber, distancing from said slit that portion of a film spanning the spools and having means reducing entrant light to a narrow slit at the film, means attached to the shell to spin with it, having bearing supports for the spools so that the spools can revolve independently, and gearing coupling one of the spools with the wheel, being animated by the motion of the shell relative to the mass to drive said one spoon continuously.

9. In a camera, a case having a light slit, a spacer erected in the case, having a channel extending from the slit to its opposite and inner end, a bar across the channel next to the slit, having a pinhole to resolve the entrant light into a spot, a piece of opaque material onto which the spot is adapted to fall, having a narrow slit through which light from the spot emerges as a dash, a spool on each side of the spacer adapted to support a photographic film strip in transit across said opposite end to intercept the dash, means carrying the spools to revolve in the case, a gear box having a gear component coupled to one of the spools, and an inert mass journaled in the case, being coupled to another gear component to impart motion to said one spool by a rotation of the case relative to the mass.

References Cited in the file of this patent
UNITED STATES PATENTS

| | | |
|---|---|---|
| 220,792 | Berdan | Oct. 21, 1879 |
| 565,172 | Moubeuge | Aug. 4, 1896 |
| 792,423 | Kiessig | June 13, 1905 |
| 1,757,800 | Henderson | May 6, 1930 |